3,026,207
MARGARINE
Maynard Murray, 227 Kilpatrick St., Wilmette, Ill.
No Drawing. Filed May 27, 1960, Ser. No. 32,115
8 Claims. (Cl. 99—122)

This invention relates to margarines and more particularly to margarines which are characterized by a high content of polyunsaturated glyceride oils.

Essential fatty acids, viz.: linoleic and linolenic acids, are important nutrients aiding in proper growth, development of normal tissue structure, reproduction, and the like. Moreover, experimental studies have led to a belief within the medical profession that polyunsaturated fatty acids are effective to control blood cholesterol. Since high cholesterol levels have been associated with arteriosclerosis, the desirability of introducing polyunsaturated fatty acids into the diet for this purpose alone is apparent. These acids cannot be produced within the body and therefore must be supplied in the diet.

While margarines suggest themselves as a most appropriate means for introducing polyunsaturated fatty acids into a diet, significant problems arise when unsaturated fatty acid glycerides are employed in the production of margarine. As a threshold matter, polyunsaturated glyceride oils are liquid or limped and consequently standard procedures fail to provide an emulsified product which is characterized by the proper stability and consistency. Attempts to increase the consistency of a margarine by hydrogenation obviously will reduce the unsaturation of the oil and therefore tend to defeat the goal which is sought to be obtained.

Another significant problem arises by virtue of the instability of the olefinic unsaturation of the fatty acids. Oxidative attack on the unsaturated bond leads initially to the formation of peroxides and ultimately to the formation of aldehydes, ketones and the like. An extensive investigation of antioxidants has failed to provide a practical means to prevent margarines having a high content of unsaturated fatty acids from becoming rancid. Apart from economic considerations, antioxidants often are either not sufficiently effective or adversely affect the taste of the margarine.

As a result of the undesirable qualities of polyunsaturated fatty acid triglycerides, commercial margarines packaged and marketed in a routine manner normally contain less than about 20% polyunsaturated fatty acid. At least one product having a high unsaturated fatty acid content is vacuum packed and must be refrigerated.

Recent activity directed toward providing margarines having a high content of polyunsaturated fatty acids is reflected, inter alia, by U.S. Patents Nos. 2,890,959 and 2,921,855.

It is a primary object of this invention to provide a margarine containing a high proportion of polyunsaturated fatty acids.

It is a further object of this invention to provide a margarine containing a high proportion of polyunsaturated fatty acids which is characterized by a consistency similar to butter.

It is another object of this invention to provide a margarine containing a high proportion of polyunsaturated fatty acids which is characterized by a consistency similar to butter and which retains its consistency over extended periods of time.

It is yet another object of this invention to provide a margarine containing a high proportion of polyunsaturated fatty acids which is characterized by enhanced stability against oxidative attack.

In accordance with this invention, there is provided a margarine which comprises an oil-in-hydrated fatty carboxylic acid soap emulsion wherein the oil phase is a normally liquid glyceride oil containing at least about 20% polyunsaturated fatty acids and constitutes at least about 80% of the margarine, and wherein the continuous hydrated soap phase contains at least about 5% soap based on the total weight of water and soap present.

The margarines of this invention are characterized by a physical consistency similar to butter and retain this desired physical consistency over extended periods of time. The margarine may be stored at room temperature or under refrigeration without causing the margarine to break down. Moreover, the margarines of this invention, containing unsaturated fatty acid glycerides, are characterized by an enhanced resistance to oxidative deterioration. Margarines containing only a minor amount of antioxidant have been stored for over four months without turning rancid.

The glyceride oils which may be employed to provide the margarines of this invention include peanut oil, sesame oil, cottonseed oil, corn oil, sunflower oil, soybean oil, safflower oil and the like. These oils are characterized by a substantial content of polyunsaturated fatty acids and specifically linoleic and linolenic acids as reflected by Table 1.

TABLE 1

| Oil: | Linoleic and linoleic acid, percent |
|---|---|
| Peanut | 25 |
| Sesame | 42 |
| Cottonseed | 50 |
| Corn | 52 |
| Soybean oil | 58 |
| Sunflower | 59 |
| Safflower | 70 |

The invention also contemplates the utilization of mixtures of the above oils or mixtures of one or more of the above oils with other glyceride oils such as palm oil, olive oil and the like. While natural oils may be employed, per se, this invention also contemplates the utilization of linoleic acid triglycerides and linolenic acid triglycerides in refined form as obtained by subjecting natural oils to normal refining procedures. In all events, the glyceride oils employed in the practice of this invention are normally liquid oils and are characterized by a polyunsaturated fatty acid content of at least about 20% and, desirably, at least about 40%. Preferred margarines having a high content of polyunsaturated fatty acids utilize glyceride oils characterized by a content of at least about 50% polyunsaturated fatty acids.

The fatty carboxylic acid soaps contemplated by the present invention are well known to the art. They generally comprise the alkali metal and alkaline earth metal salts of saturated or unsaturated carboxylic acids having from about 12 to about 22 carbon atoms in the molecule. While this invention generically embraces fatty acid soaps, potassium fatty acid soaps are preferred. Potassium oleate is particularly appropriate for the practice of this invention.

In order to manufacture the margarines of this invention, water is added to the fatty acid soap to form a water-in-soap hydrate. The amount of water which may be employed will vary somewhat depending upon the specific soap employed. For potassium oleate, the soap content of the hydrate will be at least about 5%; generally from about 5% to about 40% by weight, and preferably from about 20% to about 30% by weight. These weight percentage ranges are also generally applicable for other fatty carboxylic acid soaps. The hydrate is characterized by a gel-like consistency and, as noted above, is a water-in-soap hydrate as opposed a soap-in-water suspension or solution. It will be apparent that in place of water, per se, an aqueous medium such as skim milk may be employed to supply the water necessary for the soap hydrate.

After the soap hydrate has been prepared, the liquid glyceride oil is added with mixing to provide an emulsion containing the oil as the disperse phase. Generally, the oil will constitute at least about 80% of the margarine to meet Food and Drug Administration standards, and preferably the oil will constitute at least about 85% of the margarine. Margarines, prepared according to the practice of this invention, may contain 95% or more triglyceride oil.

The amount of hydrated soap which may be employed may vary widely, observing, however, the above requirements with respect to the oil content of the margarine. Normally, the hydrated soap will constitute at least about 5% on a volume basis based upon the total volume of oil and hydrated soap employed.

The manufacture of the margarines as above-described may be carried out at normal temperatures employing standard equipment known to the art. The order of mixing the ingredients, however, is critical and must be observed in order to achieve margarines having the desired consistency and stability. Thus, for example, the addition of the soap mixture to the oil, or the saponification of oil in situ will not provide the margarines of this invention.

While the above description is directed to the oil and soap phases, other additives may be incorporated into the margarines of this invention, including, without limitation, salt, flavors, coloring matters, antioxidants, texture additives and the like.

Conventional coloring matters include oil soluble colors such as carotene, annatto, 1-phenylazo-2-naphthylamine, 1-o-tolylazo-2-naphthylamine, and water soluble colors such as the disodium or di-potassium salt of 2-4 dinitro-1-naphthol-7-sulphonic acid, the trisodium salt of 3-carboxy-5-hydroxy-1-p-sulfophenyl- 4 -p-sulfophenylazo pyrazole, 1-p-sulfophenylazo-2-naphthol-6-sulfonic acid, and the like.

A wide variety of flavor additives are known to the art and are contemplated for use in this invention. These include, inter alia, ketones such as di-acetyl and the like, acids such as butyric acid and esters such as ethyl butyrate.

Anti-oxidants acceptable for edible oils and therefore embraced by this invention include, for example, propyl gallate, tocopherols, butylated hydroxyanisole, butylated hydroxytoluene, nordihydroquaiaretic acid, lecithin and others. Since materials such as lecithin function both as an anti-oxidant and a colloid stabilizer, such materials most appropriately may be incorporated into the margarines of this invention.

Other additives such as the various gums, proteins and the like also may be employed without departing from the scope of this invention. Proteins including skim milk solids, whey albumins, egg albumins and the like may be incorporated into the margarines in substantial amounts without adversely affecting the stability of the emulsion.

The following examples are included in order more fully to demonstrate the practice of this invention. These examples are included for illustrative purposes only and in no way are intended to limit the scope of the invention.

*Example I*

Water was admixed with potassium oleate to form a gel-like hydrated soap mixture containing about 25% by weight of soap.

One hundred and fifty c.c. of corn oil were added slowly to 25 c.c. of the hydrated soap wtih constant mixing. Finally, salt, coloring and flavoring were added.

The resulting yellow-colored oil-in-soap emulsion was characterized by a viscosity and texture similar to butter.

*Example II*

The method of Example I was repeated except that 450 c.c. of corn oil were employed. Again, an oil-in-soap emulsion was obtained which was characterized by a viscosity and texture similar to butter.

*Example III*

The method of Example I was repeated except that about 350 c.c. of corn oil were employed. The resulting oil-in-hydrated soap emulsion was excellently suited as a margarine.

*Example IV*

Water was admixed with potassium oleate to form 25 c.c. of a hydrated soap mixture containing about 25% by weight of soap. About ½ gram of lecithin and about 5% of milk solids protein were added to the soap mixture and thereafter 400 c.c. of cottonseed oil were added with mixing to provide an oil-in-soap emulsion.

The completed emulsion with salt, carotene coloring and flavoring added was, in all respects, a satisfactory margarine.

Since modifications of this invention will be apparent to one skilled in the art, it is intended that this invention be limited only by the scope of the appended claims.

I claim:

1. A margarine comprising an oil-in hydrated fatty carboxylic acid soap emulsion wherein the oil phase is a normally liquid glyceride oil containing at least about 20% polyunsaturated fatty acids and constitutes at least about 80% of the margarine, and wherein the continuous soap phase is a water-in-soap hydrate and contains at least about 5% of soap based on the total weight of water and soap present.

2. The margarine of claim 1 wherein the glyceride oil is characterized by a polyunsaturated fatty acid content of at least about 40%.

3. The margarine of claim 1 wherein the hydrated soap phase contains from about 20% to about 30% by weight of soap.

4. The margarine of claim 3 wherein the glyceride oil is characterized by a polyunsaturated fatty acid content of at least about 40%.

5. A margarine comprising an oil-in hydrated fatty carboxylic acid soap emulsion wherein the oil phase is a normally liquid glyceride oil containing at least about 40% ployunsaturated fatty acids and constitutes at least about 85% of the margarine, and wherein the continuous soap phase is a water-in-soap hydrate and contains from about 20% to about 30% of soap based on the total weight of water and soap present.

6. The margarine of claim 5 wherein the glyceride oil is characterized by a polyunsaturated fatty acid content of at least about 50%.

7. The margarine of claim 5 wherein the fatty carboxylic acid is a potassium soap.

8. The margarine of claim 5 wherein the fatty carboxylic acid soap is potassium oleate.

References Cited in the file of this patent

UNITED STATES PATENTS

| | | |
|---|---|---|
| 1,553,294 | Baker | Sept. 8, 1925 |
| 2,132,394 | Coith et al. | Oct. 11, 1938 |
| 2,890,959 | Phillips | June 16, 1959 |

OTHER REFERENCES

"Fatty Interface Modifiiers—Composition, Properties and Uses in the Food Industries," by Harris et al., reprinted from Oil and Soap, vol. XVIII, No. 9, September 1941, pp. 179–182.